United States Patent [19]
Adell

[11] Patent Number: 4,787,175
[45] Date of Patent: Nov. 29, 1988

[54] NON-METALLIC DOOR EDGE GUARD

[75] Inventor: Robert Adell, Sunnyvale, Tex.

[73] Assignee: U.S. Product Development Company, Sunnyvale, Tex.

[21] Appl. No.: 129,544

[22] Filed: Dec. 7, 1987

Related U.S. Application Data

[63] Continuation-in-part of Ser. No. 004,658, Jan. 20, 1987, Pat. No. 4,730,415.

[51] Int. Cl.$^4$ .............................................. E05F 7/00
[52] U.S. Cl. ....................................... 49/462; 52/716
[58] Field of Search ................... 49/462, 460; 52/716, 52/717

[56] References Cited

U.S. PATENT DOCUMENTS

| | | | |
|---|---|---|---|
| 3,547,515 | 12/1970 | Shanok et al. | 52/716 X |
| 3,547,516 | 12/1970 | Shanok et al. | 52/716 X |
| 3,706,173 | 12/1972 | Taylor | 49/462 X |
| 4,372,083 | 2/1983 | Hatzikelis et al. | 49/462 |
| 4,730,415 | 3/1988 | Adell | 49/462 |

Primary Examiner—Philip C. Kannan
Attorney, Agent, or Firm—Rhodes and Boller

[57] ABSTRACT

A layer of material is joined to the exterior surface of a non-metallic edge guard body with the side edges of the layer of material slightly embedded into the body to resist delamination.

6 Claims, 11 Drawing Sheets

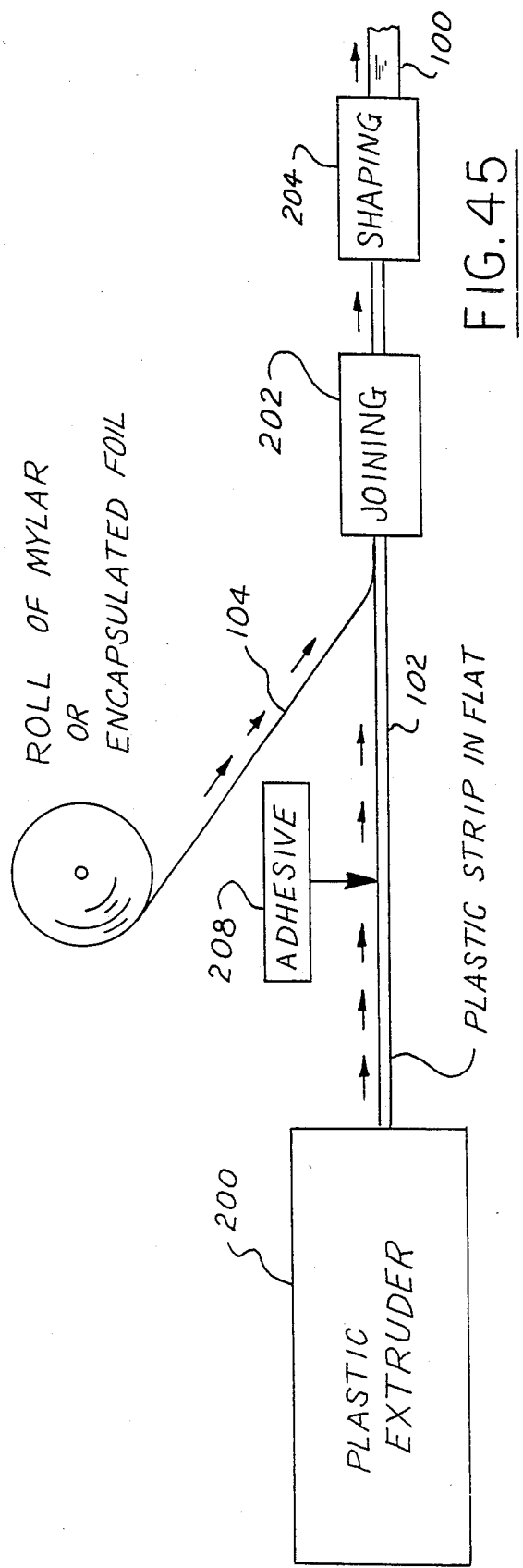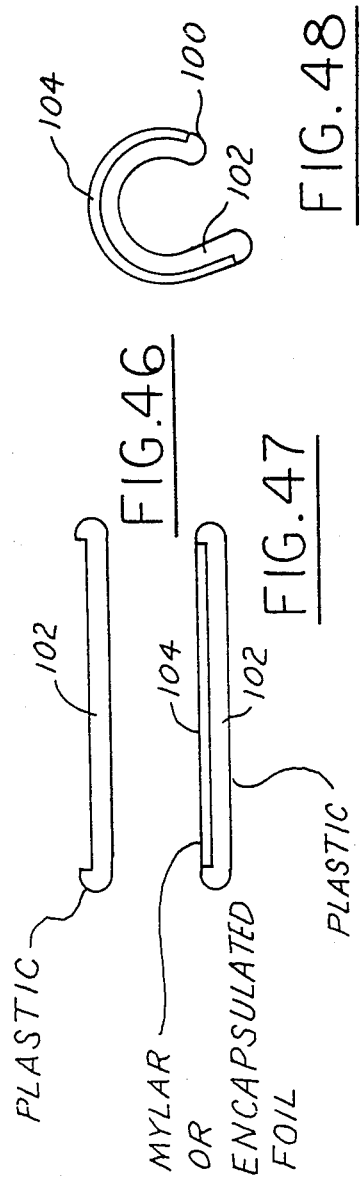

NON-METALLIC DOOR EDGE GUARD

REFERENCE TO A RELATED APPLICATION

This application is a continuation-in-part of allowed U.S. Ser. No. 004,658, filed Jan. 20, 1987 now U.S. Pat. No. 4,730,415.

BACKGROUND AND SUMMARY OF THE INVENTION

This mechanical invention relates generally to edge guards, and more particularly it relates to novel non-metallic edge guards, for use such as on the trailing edge of swinging closures.

Edge guards are used as protective and decorative articles on the edges of objects. In the case of a swinging closure of an automotive vehicle such as an automobile door, an edge guard which is applied to the trailing edge of the swinging closure can provide not only decoration, but also protection when the trailing edge is swung against an object. The edge guard can provide protection not only for the trailing edge of the swinging closure, but also for the object which is struck by the trailing edge of the swinging closure. That is not to say that an edge guard can protect and withstand substantial impacts, but edge guards are useful in preventing chipping, knicking, scratching and like damage which typically arises in regular everyday use of an automobile, for example the opening and closing of a car's doors in a confined space such as in a crowded parking lot.

Applicant is the inventor of many edge guard improvements over the years. These improvements are the subjects of many patents. For the most part, these patented improvements relate to metallic edge guards, or insulated metallic edge guards. Metal possesses superior decorative and function characteristics, and the insulated metallic edge guards advantageously combine the benefits of metallic and non-metallic components.

Although Applicant continues to prefer the insulated metallic type of edge guard for automotive use because of the combination of benefits which it provides, he has discovered ways to improve upon non-metallic edge guards in several ways which can be useful for certain applications. These improvements in non-metallic edge guards are the subject of this patent application Non-metallic edge guards are not broadly new. Examples exist in prior patents such as U.S. Pat. No. 3,547,516 and U.S. Pat. No. 4,372,083. While these prior non-metallic edge guards claim to possess certain beneficial characteristics, the truth of the matter is that in practice they are difficult to install, especially on contoured edges, and once installed they may not retain satisfactorily over the life of the automobile. More especially, the improved body fit programs of the automobile manufacturers in recent years renders it difficult to fit the non-metallic edge guards onto the doors without interference with the door frame openings when the doors are closed.

The present invention is directed to new and useful improvements in non-metallic edge guards which render them superior to the prior non-metallic edge guards. These improvements relate to the ability to give satisfactory fit, retention, decoration and protection. Details of the improvements will be seen in the ensuing description and claims which should be considered with the accompanying drawings. The drawings disclose a preferred embodiment in accordance with the best mode contemplated at the present time in carrying out the invention.

BRIEF DESCRIPTION OF THE DRAWINGS

FIGS. 45–48 are views illustrating a method of making the edge guards.

DESCRIPTION OF THE PREFERRED EMBODIMENT

Figure 1:
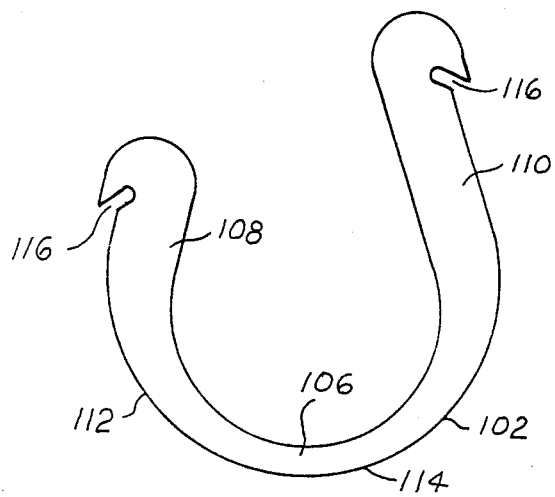
FIGS. 1–22 are longitudinal end views of the non-metallic bodies of different embodiments of edge guards according to the invention.

In the several views wherein like reference numerals designate like parts, the edge guard 100 comprises a non-metallic body 102 and a much thinner outer layer 104 applied at least to the exterior of body 102. The body comprises a curved base 106 and legs 108, 110 which extend from base 106, thereby giving the edge guard a general U-shaped or V-shaped cross section which is open in varying degrees as portrayed by the several drawing figures. FIGS. 1–22 show various bodies 102. In some figures the legs are of different lengths; in others they are the same length.

The bodies are formed with various notching patterns for reception of layer 104 in various ways. The notching is designated, generally, by the numeral 112 and corresponds in thickness essentially to the thickness of layer 144. In some embodiments the notching comprises an undercut 114, in others one or more slots 116, and in still others a combination of both. There are various configurations of notching and slotting.

In general, the undercutting 114 extends along a substantial portion of the outside of at least one of the legs and partially into the base. The slotting in general takes place adjacent the distal end of a leg, on either the interior or the exterior face of the body, and is at an angle to the length of the corresponding leg. FIGS. 1–22 show various forms of bodies containing various patterns of undercuts 114 and slots 116.

FIGS. 23–44 show the finished edge guards after the layers 104 have been joined to the bodies. The layers fully occupy the zones of notching, and where there are slots in the body, the margins of the layers are inserted into the slots. Hence, layers 104 cover the exterior of the body along at least a portion of the base and a substantial adjoining portion of a leg adjacent the base. The layers also possess flushness in relation to body 102 in the finished edge guard.

Figure 2:
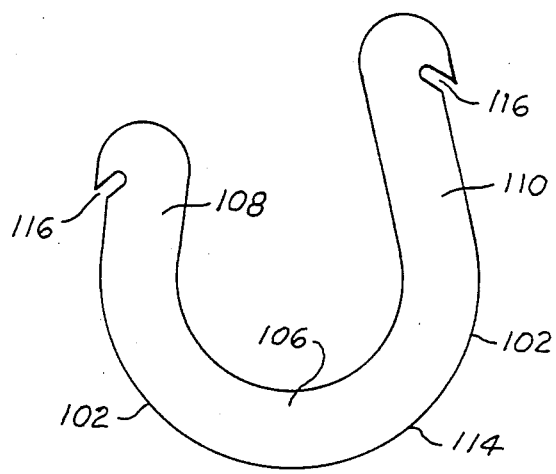
Figure 3:
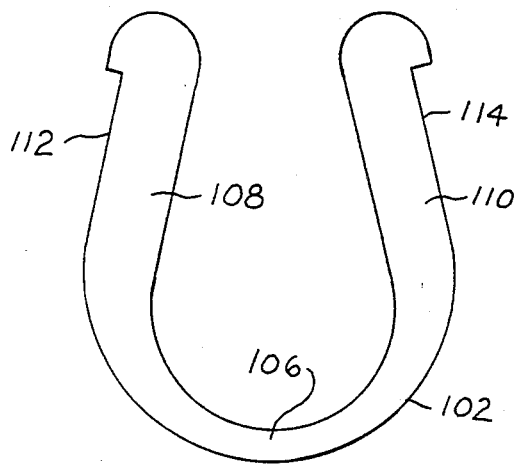
Figure 4:
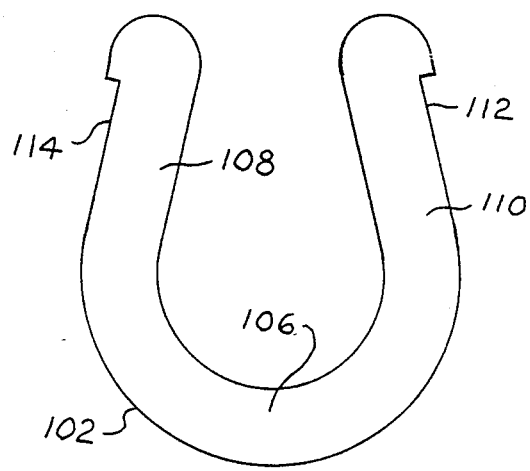
Figure 5:
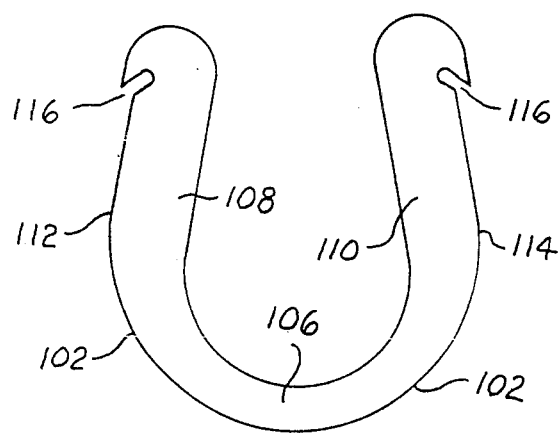
Figure 6:
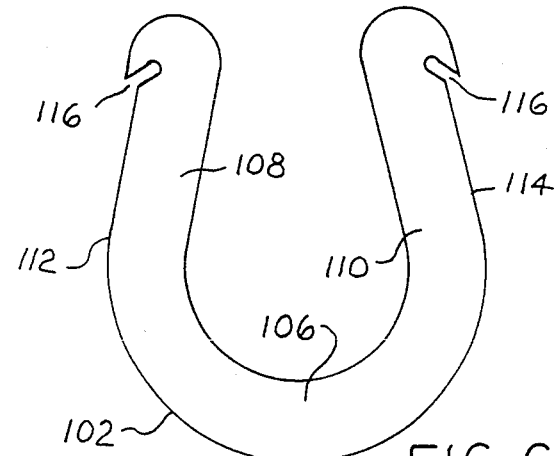
Figure 7:
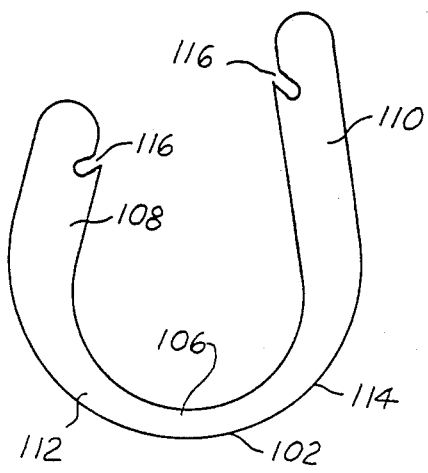
Figure 8:
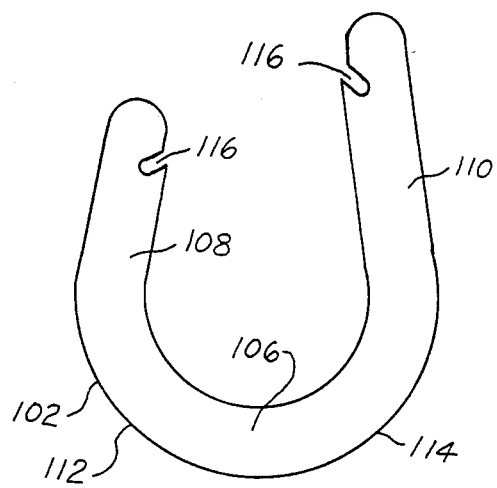
Figure 9:
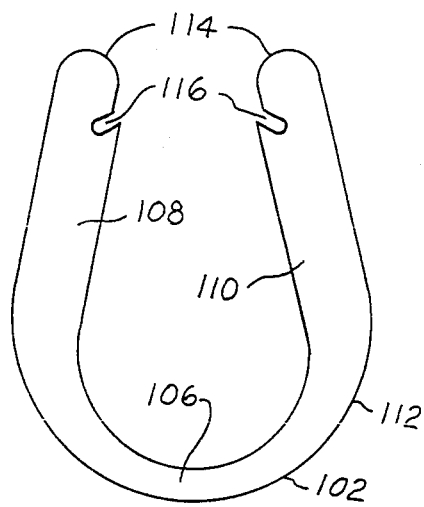
Figure 10:
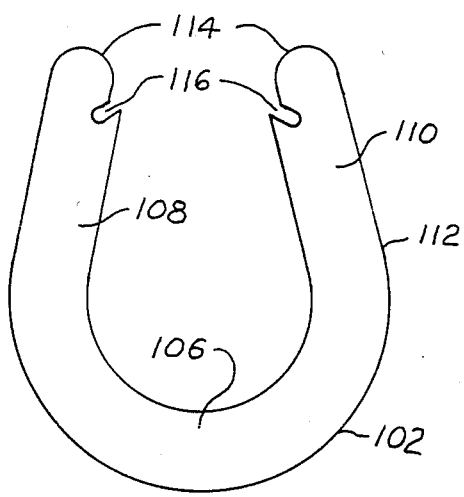
Figure 11:
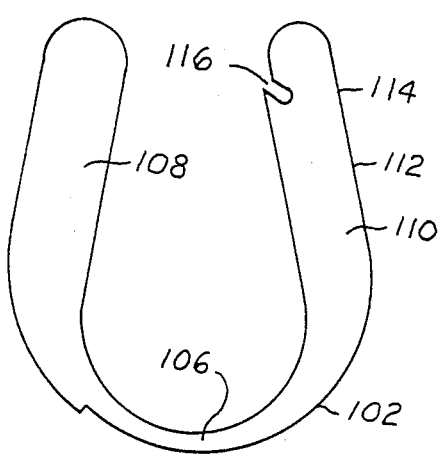
Figure 12:
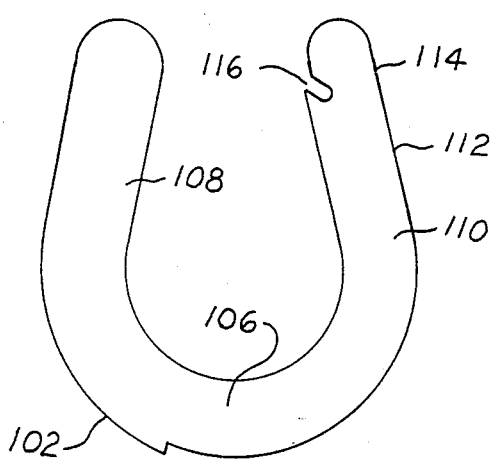
Figure 13:
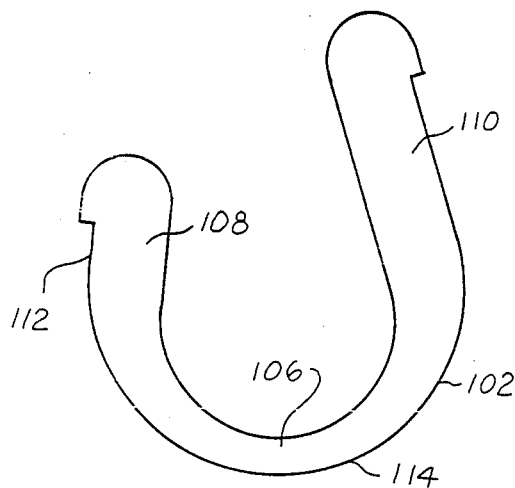
Figure 14:
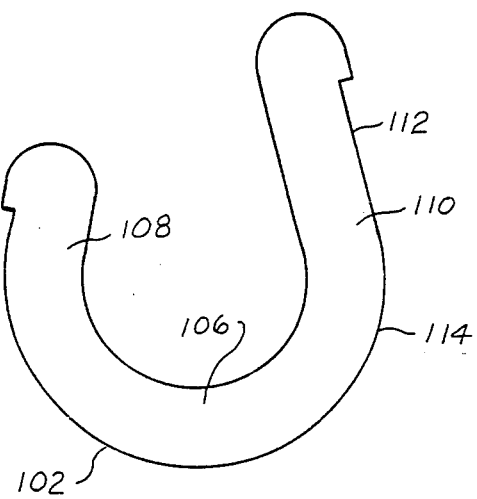
Figure 15:
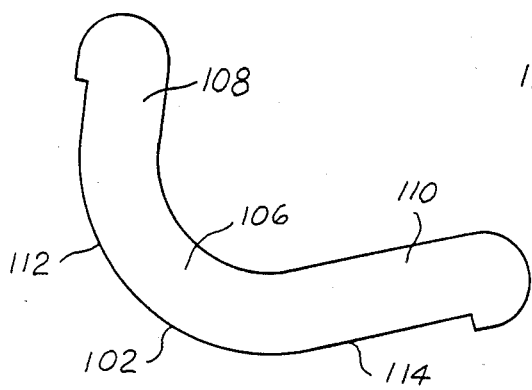
Figure 16:
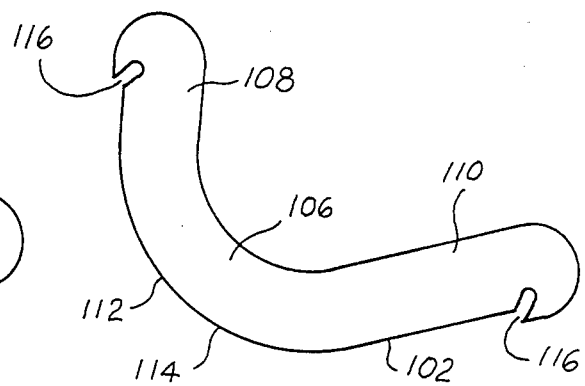
Figure 17:
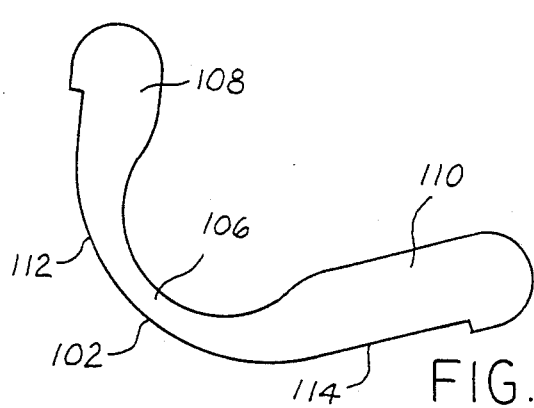
Figure 18:
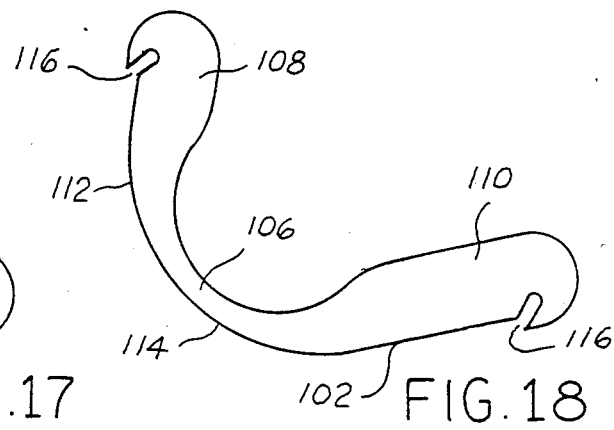
Figure 19:
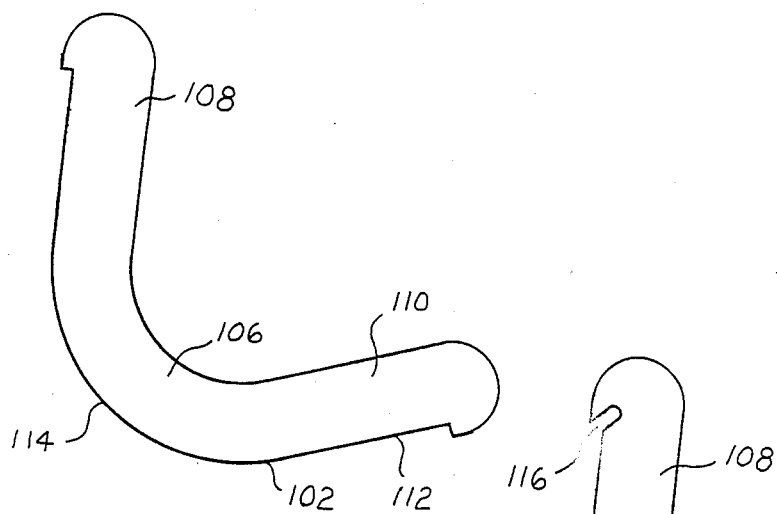
Figure 20:
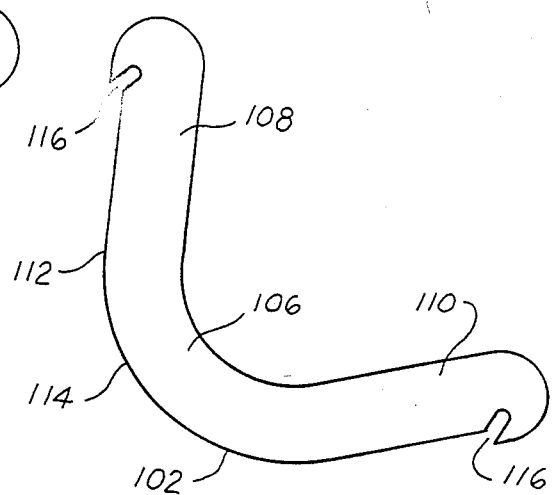
Figure 21:
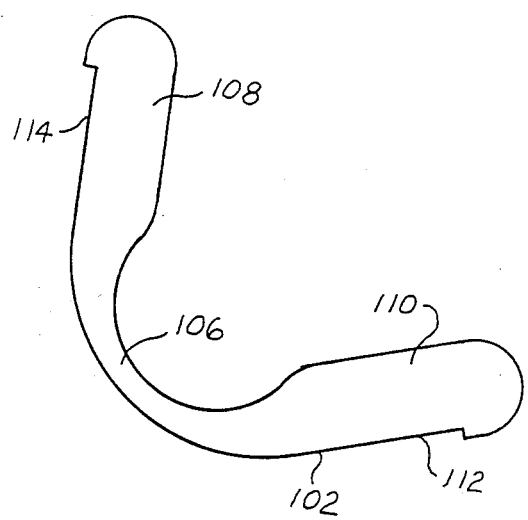
Figure 22:
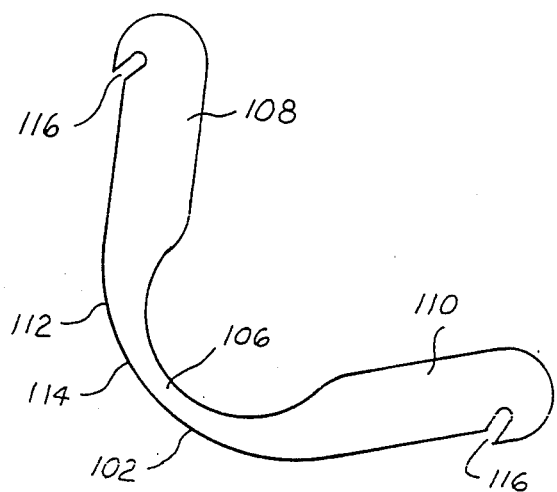
Figure 23:
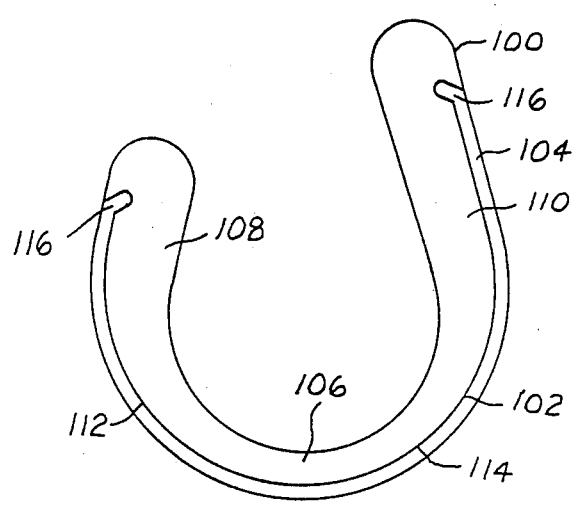
FIGS. 23–44 are end views corresponding to FIGS. 1–22 of the completed edge guards.
Figure 24:
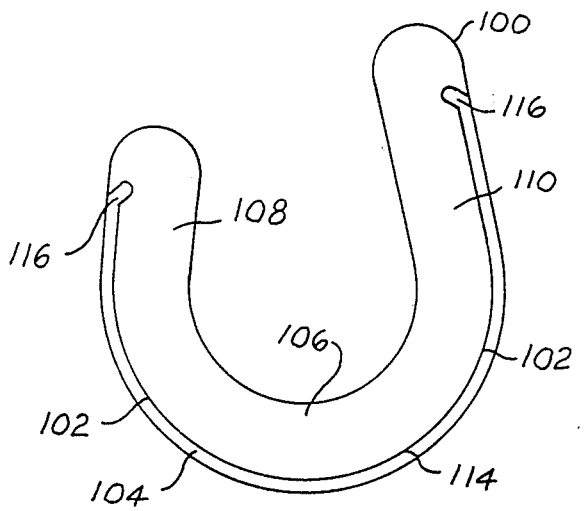
Figure 25:
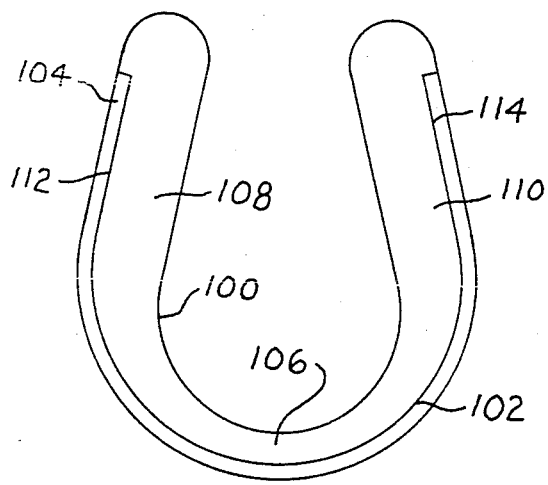
Figure 26:
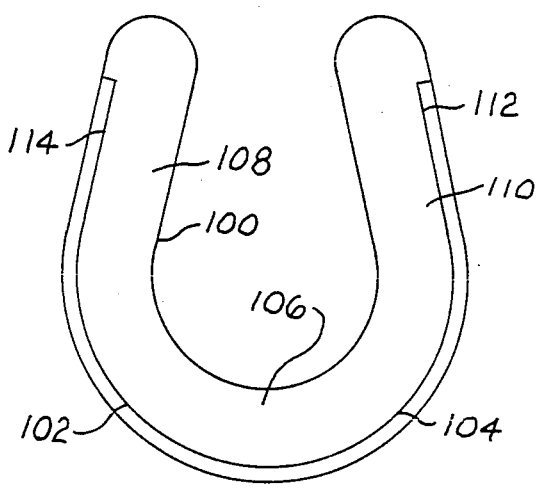
Figure 27:
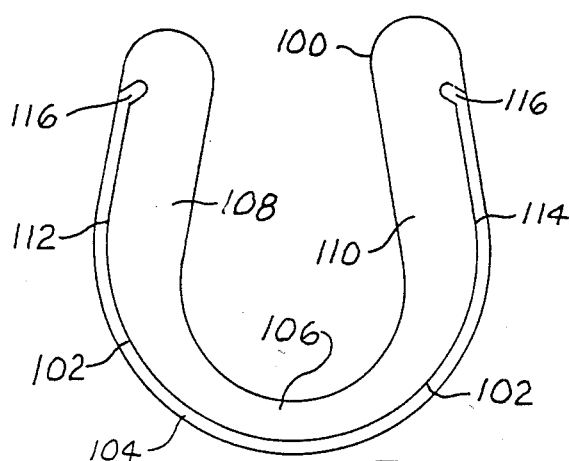
Figure 28:
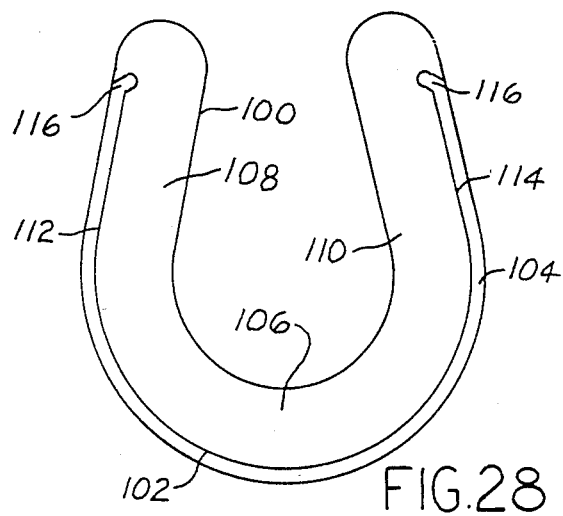
Figure 29:
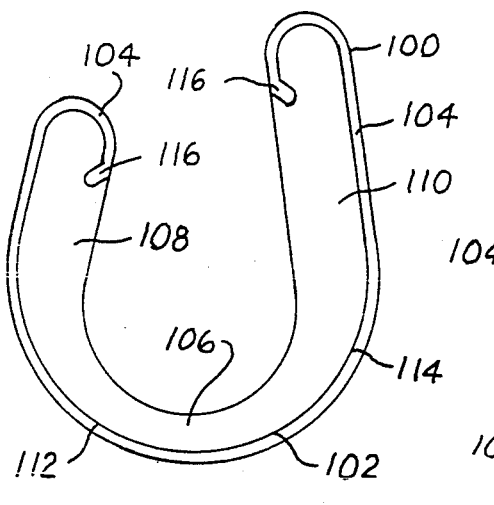
Figure 30:
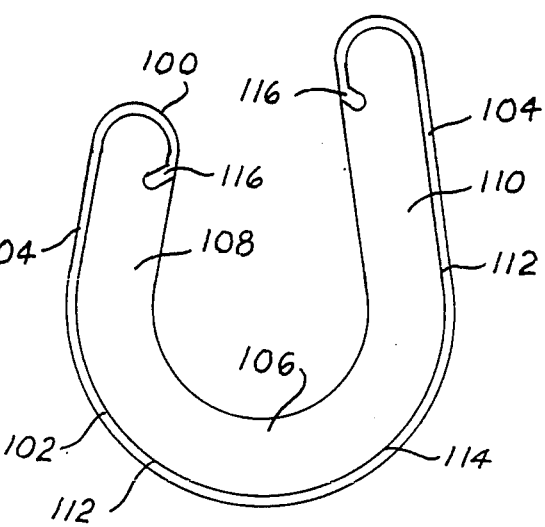
Figure 31:
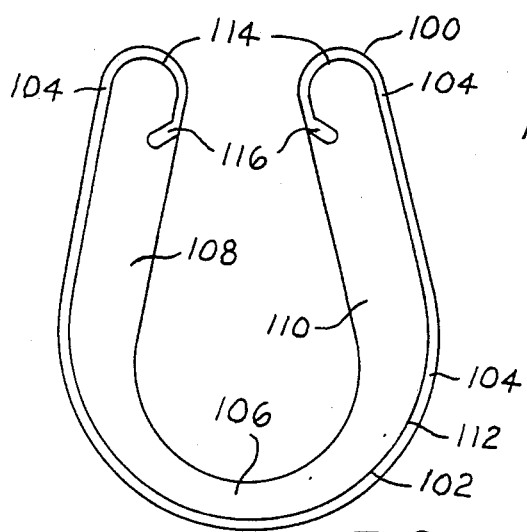
Figure 32:
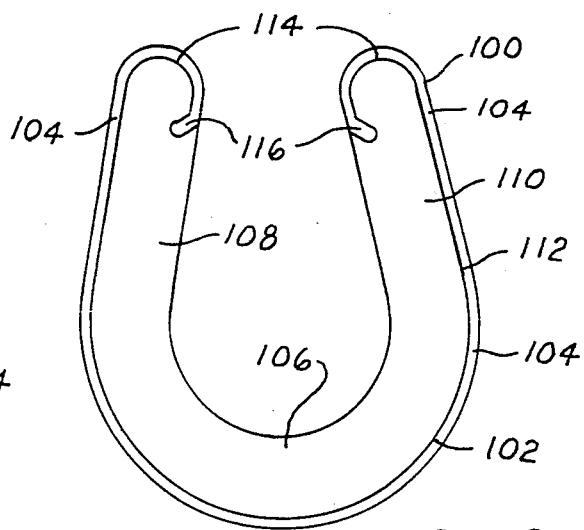
Figure 33:
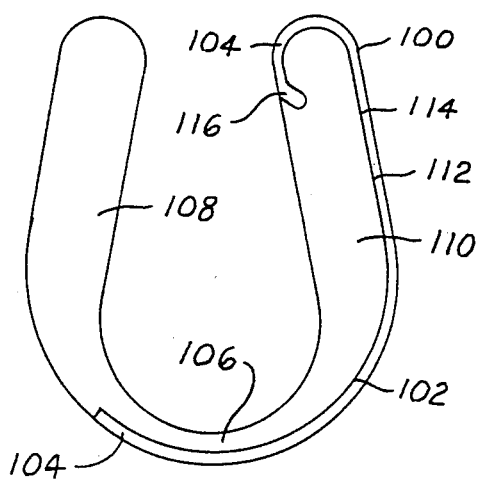
Figure 34:
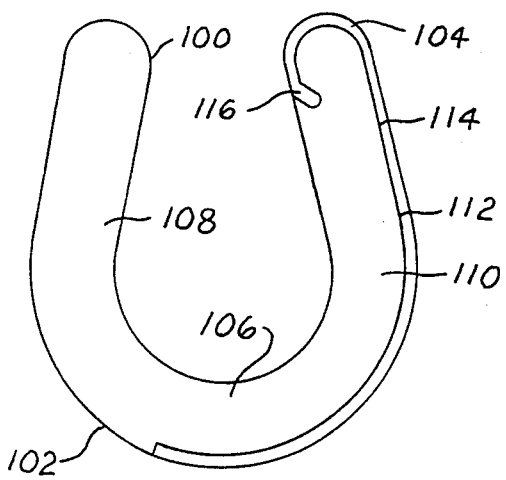
Figure 35:
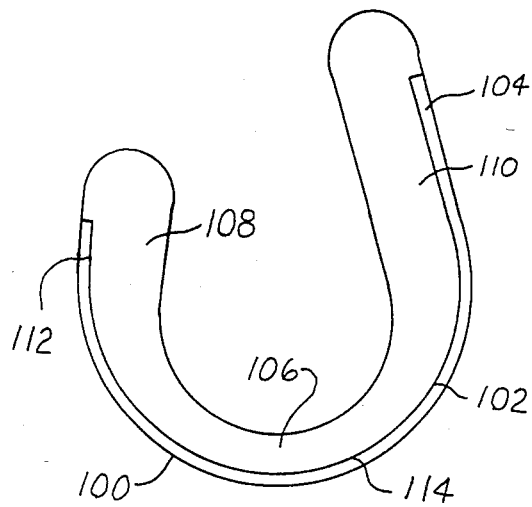
Figure 36:
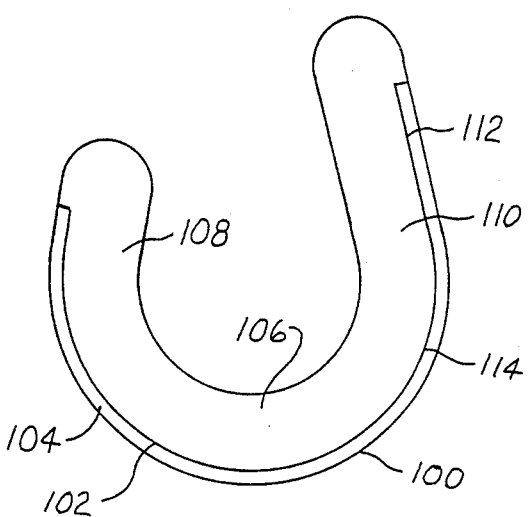
Figure 37:
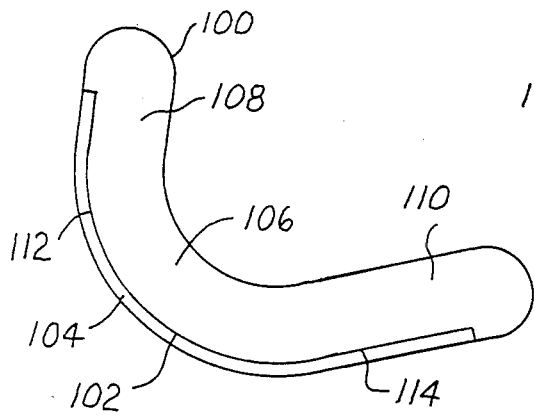
Figure 38:
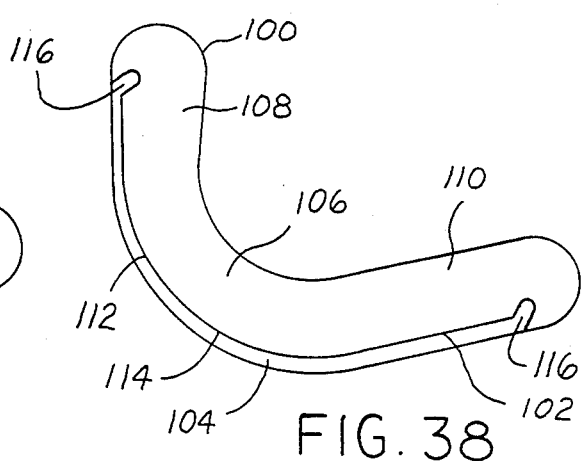
Figure 39:
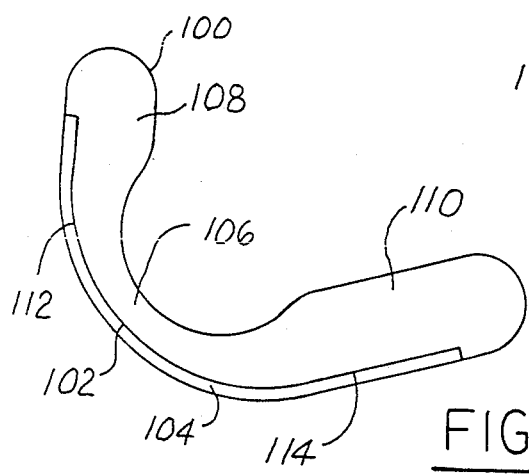
Figure 40:
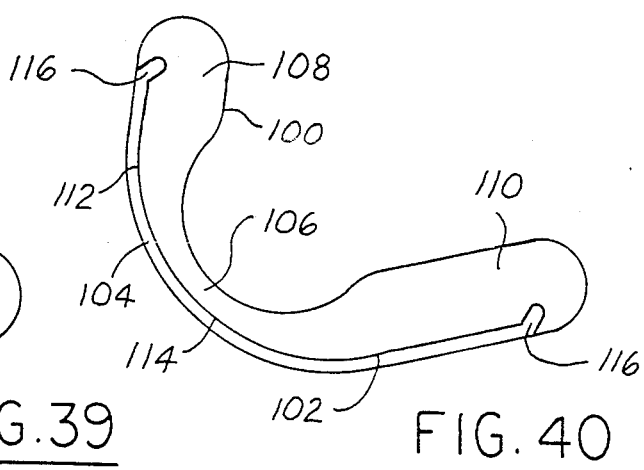
Figure 41:
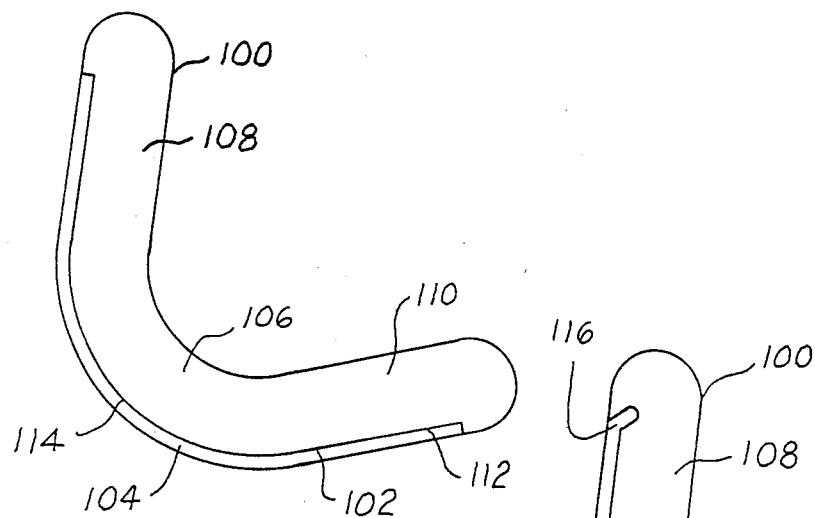
Figure 42:
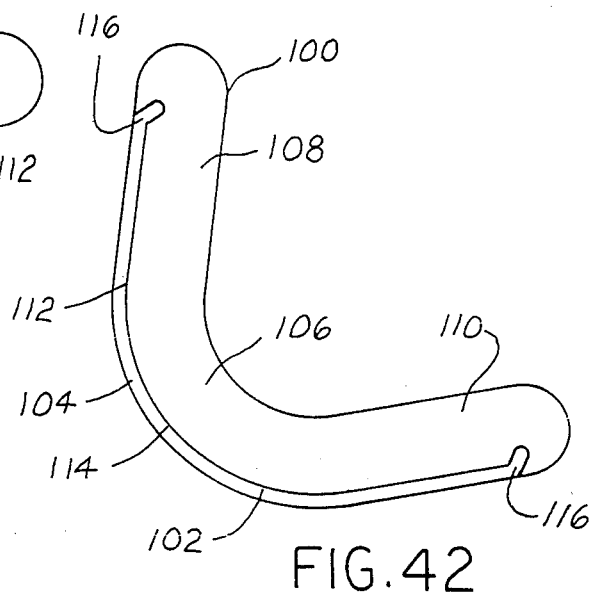
Figure 43:
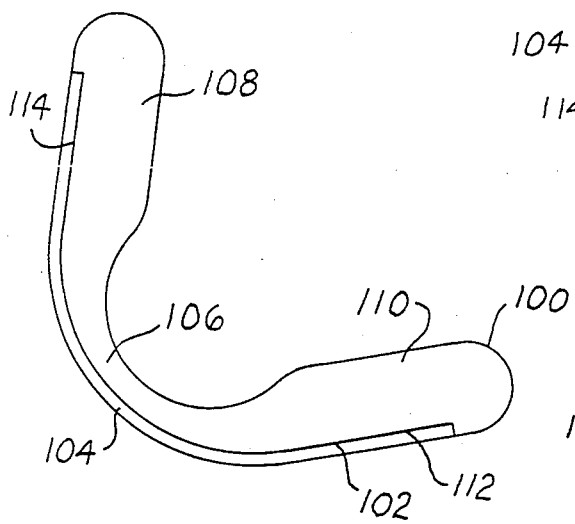
Figure 44:
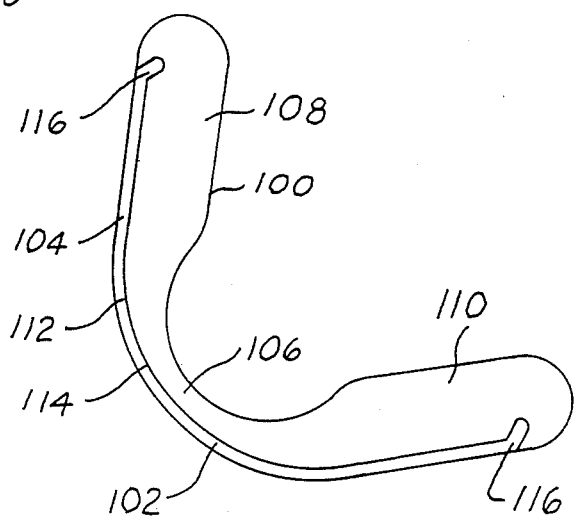
Figure 49:
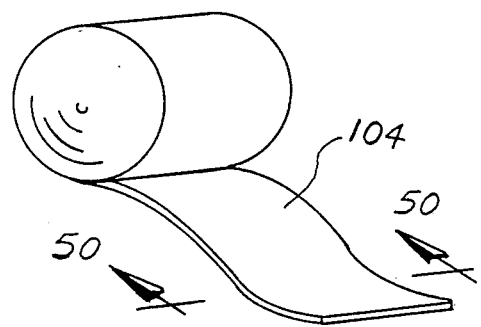
FIG. 49 is a perspective view illustrating a step in the method.

Certain of the embodiments of edge guard bodies have essentially uniform thickness throughout their legs and base. FIG. 2 is an example. Other embodiments, however, have a reduced thickness base such as FIG. 1, for example. The reduced thickness base is advantageous in securing better conformance and fit especially where the extent of the base exceeds 180°, although the reduced thickness base can be useful in embodiments, such as FIG. 22, where the extent of the base is less than in FIG. 1. The illustrated shape of reduced thickness bases is advantageous from manufacturing and use standpoints. It involves a gradually reducing taper extending from the proximal end of each leg to essentially the mid-point of the base.

FIGS. 45-48 show a method of making the edge guards. The material of body 100 is extruded by a conventional plastic extruder (step 200 in the flat to contain the desired notching pattern. These FIGS. 45-48 illustrate making the example of FIG. 36. The layer 104 is joined to the body in fit to the notching pattern so that the two parts 102, 104 become a unit (step 202). Then the unit is formed to the desired shape such as that portrayed by FIG. 48 (step 204). Preferably adhesive is applied (as a step 208) to the notching before the layer 104 is joined to the body 102 to aid in the joining of the two parts. Since the body is still warm after leaving the extruding step, it is possible that the heat and the characteristics of the respective materials constituting parts 102 and 104 could be suitably joined without the adhesive application step. Likewise it is to be appreciated that the illustrated method, although preferred, is not necessarily the only way to make the finished edge guard. For instance, the body could be extruded directly to the final shape and the layer then applied to the finished shape of the body.

Various plastic materials are suitable for the body; PVC however has certain advantages for certain applications and will probably enjoy the most widespread use. It can be colored to desired colors and can be extruded to different cross sectional shapes with standard equipment containing suitable dies to produce the desired cross section. Moreover, there are adhesives available for use in joining the plastic and the layer 104 and also joining the plastic to an edge of most metallic and/or painted edges onto which the edge guard is installed.

The layer 104 is both decorative and functional. The layer can be made in different colors to match, and or contrast with the color of body 102. The layer also adds a protective character which is not present in the PVC body. Use of a material such as mylar, or PVF, for the layer 104 provides functional attributes of durability and toughness, yet are compatible for joining with PVC through use of conventional joining processes such as those described above.

Figure 50:
FIG. 50 is an enlarged sectional view along line 50—50 in FIG. 49.
Figure 51:
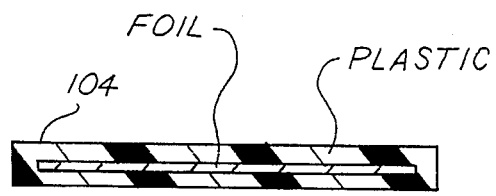
FIG. 51 is a modified form of FIG. 50.

FIG. 50 illustrates a PVF layer 104 and FIG. 51 illustrates mylar. The mylar is transparent and contains an encapsulated metallic foil. This enables the edge guard to be endowed with a metallic looking appearance.

Figure 54:
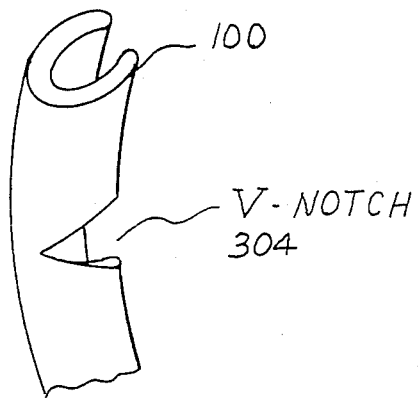
FIGS. 53 and 54 are modified forms of edge guards for facilitating installation on contoured edges.
Figure 53:
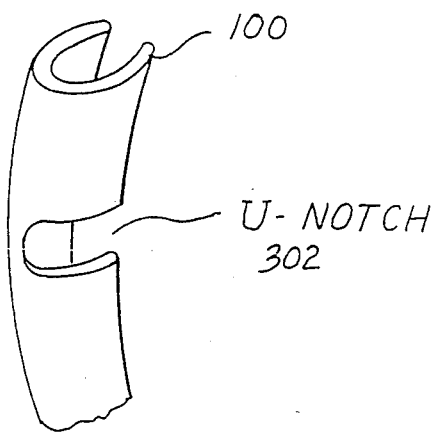
Figure 52:
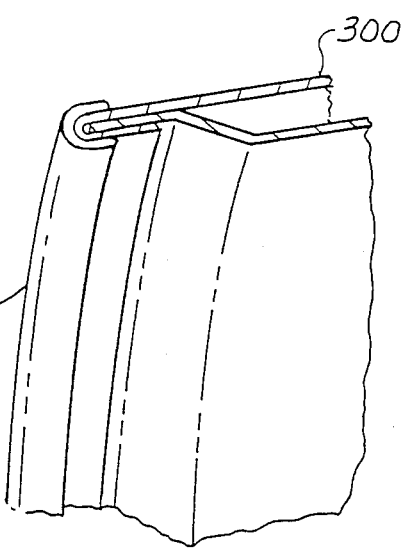
FIG. 52 is a view illustrating a representative installation of an edge guard.

FIG. 52 shows an edge guard 100 installed on the edge of an automobile door 300. Where the edge is highly contoured, it may be desirable to impart either a U-shape or a V-shape notching pattern 302, 304 as shown in FIGS. 53 and 54 respectively.

Figure 55:
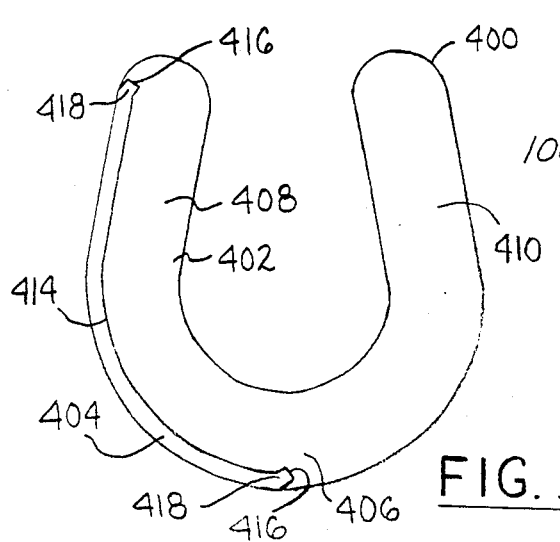
FIG. 55 is a longitudinal end view of a further embodiment of edge guard.

FIG. 55 shows a further embodiment of edge guard 400 that bears many similarities to the other preceding embodiments; there are however certain significant differences. The non-metallic body 402 has a general U-shape that is quite similar to body 102 in FIG. 28. It has a layer 404 that is similar to layer 104 in FIG. 28, but layer 404 covers the exterior of body 402 only along one leg 408 and the adjoining half of the curved base 406. Thus body 402 has an undercut 414 for receiving layer 404. It also has slots 416 for reception of the side edges 418 of layer 404, but these slots 416 are quite shallow. In fact, provision for them need not even be incorporated into the extruding die that is used to create the cross section of body 402 during its fabrication by an extension process. Rather, they can be created in the extruded plastic, before it has fully set, by forcing, or tucking, the side edges 418 of layer 404 into the still somewhat formable material of body 402 at the opposite terminations of undercut 414, as viewed endwise of body 402 Upon body 402 fully setting, the slots 416 that are formed by so embedding the layer's side edges 418 in body 402, are able to retain the edges thereby reducing any tendency toward separation and/or delamination.

Various combinations of heat and/or pressure and/or adhesive may be used to join layer 404 to body 402 in the manner described, any particular combination used being primarily a function of the particular materials for layer 404 and body 402.

A preferred material for body 402 is PVC, and a preferred material for layer 404 is a metal foil that is encapsulated in mylar. By disposing leg 408 on the exterior of the trailing edge of an automobile door, a metallic appearance is presented. Alternately, by disposing the other leg 410 on the exterior of the edge, the color of body 402 is presented. Hence, the single edge guard 400 is capable of presenting either of two different exterior appearances, yielding a savings over having to make and inventory two different models of edge guard, one fully metallic, the other fully the color of the non-metallic body 402.

Although only a single embodiment of edge guard incorporating the specific details of FIG. 55 is disclosed, it should be readily apparent that the specific principles disclosed in embodiment 400 can be incorporated in other cross sectional shapes for the non-metallic body.

The edge guard exhibits the ability to conform to the edge onto which it is installed, but typically lacks the ability to be self-retaining. Consequently, an adhesive is applied to the interior of the body to cover the legs and base so that the entirety of the interior face can be adhered to the edge onto which the edge guard is fitted.

While preferred embodiments of the invention have been disclosed, it will be appreciated that principles are applicable to other embodiments.

What is claimed is:

1. In combination with the trailing edge of a swinging closure, the improvement in a decorative and protective edge guard fitted onto the trailing edge of the swinging closure, comprising a non-metallic body having a curved base fitting over the edge and legs extending from the base to fit against sides of the swinging closure adjacent the edge, said body containing notch structure forced in its surface and having a certain thickness, a layer of non-metallic material having a thickness corresponding essentially to the thickness of said notch structure, and cooperatively joined to said body and fitted to said notch structure, said layer overlying at least a portion of the exterior surface of said base and an adjoining portion of one of the legs and in which side edges of said layer of non-metallic material that extend lengthwise of the edge guard are embedded into the material of said body.

2. The improvement set forth in claim 1 in which said layer comprises a transparent non-metallic material encapsulating a foil.

3. The improvement set forth in claim 2 in which said body, viewed endwise, is essentially symmetrical about an imaginary plane that divides the base into two halves, and said layer, viewed endwise of the edge guard, covers essentially exactly one-half of the exterior surface of said base and at least substantially all the exterior surface of the adjoining leg, the other half of the exterior surface of said base and the exterior surface of the other leg being uncovered.

4. In combination with the trailing edge of a swinging closure, the improvement in a decorative and protective edge guard fitted onto the trailing edge of the swinging closure, comprising a non-metallic body having a curved base fitting over the edge and legs extending from the base to fit against sides of the swinging closure adjacent the edge, said body, viewed endwise, is essentially symmetrical about an imaginary plane that divides the base into two halves, a layer of material cooperatively joined to said body and which, viewed endwise of the edge guard, covers essentially exactly one-half of the exterior surface of said base and at least substantially all the exterior surface of the adjoining leg and in which side edges of said layer of material that& extend lengthwise of the edge guard are embedded into the material of said body, the other half of the exterior surface of said base and the exterior surface of the other leg being uncovered.

5. The improvement set forth in claim 4 in which said layer comprises a transparent non-metallic material encapsulating a foil.

6. The improvement set forth in claim 4 in which said body contains notched structure formed in its surface and having a certain thickness, and said layer is disposed in said notched structure and is of substantially the same thickness.

* * * * *